United States Patent [19]

Wong et al.

[11] Patent Number: 5,249,183
[45] Date of Patent: Sep. 28, 1993

[54] INTERFACING UNIT FOR LOCAL AREA NETWORKS

[75] Inventors: Dave Wong, Mountain View; Haim Shafir, Sacramento; Joe Heideman, Orangevale; Cheng C. Shih, Rancho Cordova, all of Calif.

[73] Assignee: Level One Communications, Inc., Folsom, Calif.

[21] Appl. No.: 669,501

[22] Filed: Mar. 14, 1991

[51] Int. Cl.⁵ .............................................. H04L 12/40
[52] U.S. Cl. ................................... 370/85.3; 340/825.5
[58] Field of Search ................... 370/85.1, 85.3, 85.13, 370/85.6, 85.2, 13; 340/825.5, 825.51

[56] References Cited

U.S. PATENT DOCUMENTS 4,560,985 12/1985 Strecker et al. .................. 370/85.3

OTHER PUBLICATIONS

"Interlan, Inc.", The Ethernet Sourcebook, 1985, pp. 281-286.

Primary Examiner—Wellington Chin
Attorney, Agent, or Firm—Merchant, Gould, Smith, Edell, Welter & Schmidt

[57] ABSTRACT

A local area network (LAN) having a 10Base-T media attachment unit (MAU) is disclosed for coupling an attachment unit interface (AUI) to a twisted pair link through an AUI port of the 10Base-T MAU. In addition to meeting or exceeding standards set forth in the proposed supplement (P802.3I/D10) to IEEE standard 802.3 for LANs, the MAU provides an interface between the AUI and a RJ45 (twisted pair) connector which auto-engages when activity is detected on the twisted pair link. Lack of activity on the twisted pair link forces the 10Base-T MAU to isolate its AUI port from the AUI. An Ethernet (coaxial) type MAU commonly connected with the 10Base-T MAU at the AUI may be utilized without manual intervention when the twisted pair link is inactive.

12 Claims, 3 Drawing Sheets

INTERFACING UNIT FOR LOCAL AREA NETWORKS

FIELD OF THE INVENTION

This invention relates generally to the problem of interfacing within a local area network (LAN), and more particularly to interfacing within a LAN wherein first and second alternative transmission media are available for coupling to an attachment unit interface (AUI).

BACKGROUND OF THE INVENTION

Computer systems from their inception have been plagued with the problem of transferring data and sharing resources amongst different hardware configurations. Great inroads have been made in "networking" computers with the emergence of the local area network (LAN). A LAN is a privately owned network that offers reliable high-speed communication channels optimized for connecting computer systems within a limited geographic area such as an office, a building or a cluster of buildings. A LAN expands resource sharing by offering a common standard for communication between equipment of different vendors. A LAN is designed with enough in common to allow vendor-independent exchange of information across user applications and equipment functions. Network architectures created by most vendors conform to the International Standards Organization (ISO) seven-layer model for open systems interconnection (OSI) more fully defined in the Institute of Electrical and Electronic Engineers (IEEE) 802 standard. In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted. A typically LAN phase encodes data in a Manchester code format and serially transmits the data over a coaxial type link. The IEEE 802.3 standard specifies the coaxial link to be either a 10Base2 variety or the more popular 10Base5 type, commonly referred to as Ethernet.

A proposed supplement (P802.3I/D10), incorporated herein by reference, to the IEEE standard 802.3, augments the standard for LANs by allowing for a 10Base-T (twisted-pair) media link while maintaining compatibility with the existing data link layer specification. A 10Base-T media attachment unit (MAU) allows existing LANs which conform to the IEEE 802.3 standard to utilize a twisted pair link as its transmission media.

Another traditional problem with computer systems is coping with multiple options available and allowing flexibility between them, such as the option between Ethernet (coaxial) and 10Base-T (twisted pair) type links. Computer hardware with multiple option capability typically requires the user to reconfigure the physical interface by setting switches or jumpers each time a different option is chosen. This approach mandates that the user be knowledgeable at the hardware level in order to take advantage of the multiple option capability.

Therefore, there is a need for providing computer hardware in a LAN, and more specifically a 10Base-T MAU, that automatically responds when activity is present on a twisted pair link, or when such activity is not present, to allow a commonly connected Ethernet (coaxial) type MAU to function in place of the 10Base-T MAU.

SUMMARY OF THE INVENTION

A 10Base-T (twisted pair) media attachment unit (MAU) is disclosed for coupling attachment unit interface (AUI) circuits DO (data out), DI (data in), and CI (collision presence) and their associated inter-layer messages between data terminal equipment (DTE) or repeaters with a 10Base-T (twisted pair) link. The MAU automatically engages when activity is detected on a twisted pair link, allowing the AUI to interface with the twisted pair link, and in the absence of activity, allows the AUI to interface with a commonly connected Ethernet (coaxial) type MAU. In addition to meeting or exceeding the proposed standards of IEEE supplement (P802.3I/D10) for LANs, the 10Base-T MAU isolates its AUI port in response to a test failure for link integrity of the twisted pair link allowing a commonly connected Ethernet (coaxial) MAU to function. The automatic engagement of the 10Base-T MAU eliminates the need for manual intervention such as setting select switches or jumpers when the user has the option to chose between twisted pair and coaxial type transmission media. Link integrity is tested by detecting activity on the twisted pair link. Activity is ascertained by sensing periodic "link integrity test" pulses or valid data pulses sent from a remote 10Base-T MAU. When neither link integrity test pulses or valid data pulses are present for a predetermined time, the automatically engaging 10Base-T MAU isolates its AUI port from the AUI and the AUI port of the Ethernet MAU by putting the DI and CI circuits into a high impedance condition, and simply ignores activity on the DO circuit.

The automatically engaging 10Base-T MAU further comprises means for operating from a single CMOS five volt power supply, means for generating an internal common mode voltage, means for detecting and correcting reversed polarity of the twisted pair link, means for detecting simultaneous activity on the twisted pair link, means for internally pre-distorting data acquired from the AUI port (DO circuit), wherein the pre-distortion fits a 10Base-T jitter template of the twisted pair link, means for serially transmitting the pre-distorted data through the twisted pair link to a least one remote 10Base-T MAU, jabber control means, responsive to an abnormally long data stream from the AUI, for interrupting means for serially transmitting pre-distorted data, means for receiving and transferring serial data from the twisted pair link to the AUI port (DI circuit), means for looping data back from the DO circuit to the DI circuit, means, responsive to an absence of the twisted pair link, for disabling loop-back testing, a plurality of LED drivers for indicating transmit, receive, jabber, collision, link and reversed polarity status, and means for verifying the connection between the AUI and 10Base-T MAU wherein a signal quality error (SQE) message is send to the DTE.

For a better understanding of the invention, as well as other objects in further features thereof, reference is had to the following detailed description of the preferred embodiment taken in conjunction with accompanying drawings.

BRIEF DESCRIPTION OF THE DRAWINGS

Referring now to the drawings in which like reference numbers represent corresponding parts throughout.

DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
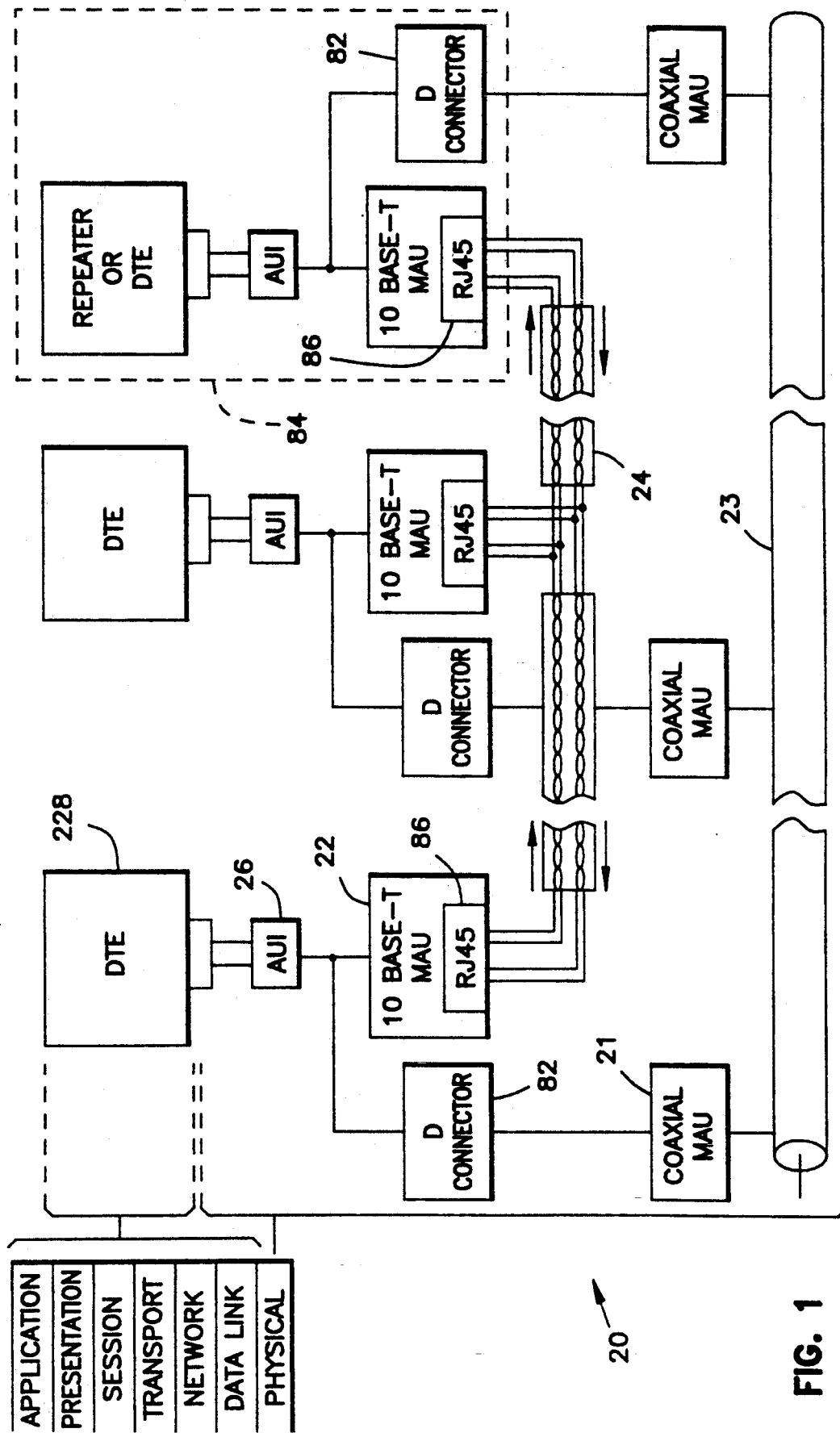
FIG. 1 is a block diagram of a local area network (LAN) wherein a 10Base-T (twisted pair) media attachment unit (MAU) and an Ethernet (coaxial) MAU are commonly connected at the AUI side.

Referring now to FIG. 1, a block diagram illustrates a local area network (LAN) 20 with a 10Base-T media attachment unit (MAU) 22 for interfacing to an unshielded twisted pair link 24 through RJ45 connector 86 and an Ethernet (coaxial) type MAU 21 for interfacing to a coaxial link 23 through D-connector 82. 10Base-T MAU 22 and Ethernet MAU 21 are commonly connected to attachment unit interface (AUI) 26 circuits DO (data out), DI (data in) and CI (collision presence). 10Base-T MAU 22 couples DO, DI, CI circuits from AUI 26 to the unshielded twisted pair link 24, allowing data to be transferred between a first data terminal equipment (DTE) 28 and a plurality of DTEs or repeaters coupled to twisted pair link 24. Self contained station 84 has access through externally accessible D-connector 82 and RJ45 connector 86 to alternative coaxial link 23 and twisted pair link 24, respectively.

In the following description of 10Base-T MAU 22, the terms "transmit" and "receive" are characterized from the perspective of AUI 26. Transmit refers to data transmitted by DTE 28 through AUI 26 to MAU 22 and twisted pair link 24 or to MAU 21 and coaxial link 23. Receive refers to data received by DTE 28 through AUI 26 from either MAU 22 and twisted pair link 24 or MAU 21 and coaxial link 23.

Figure 2:
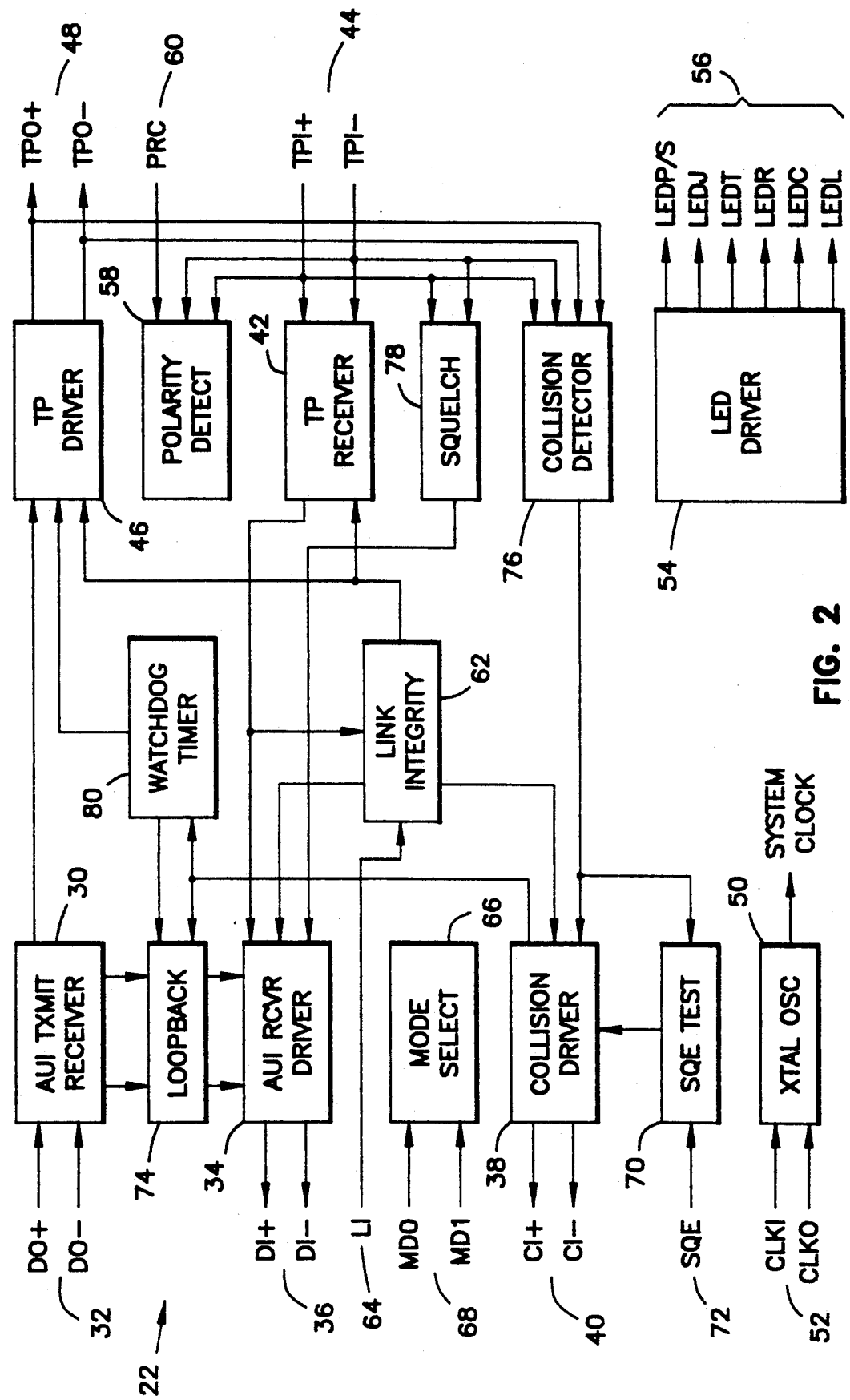
FIG. 2 is a functional block diagram of a 10Base-T (twisted pair) MAU constructed according to the principles of the present invention.

Reference is now directed to FIG. 2, a functional block diagram of an automatically engaging 10Base-T MAU 22. MAU 22 has an AUI port comprising an AUI transmit-receiver 30 for receiving data from AUI 26 over differential path (DO+, DO−) 32, an AUI receiver-driver 34 for transferring data to AUI 26 over differential path (DI+,DI−) 36 and a collision driver 38 for sending collision presence signals over differential path (CI+, CI−) 40 to AUI 26.

MAU 22 has a twisted pair port comprising a TP-receiver 42 for transferring data from twisted pair link 24 over differential path (TPI+, TPI−) 44 to AUI 26 and a TP-driver 46 for shaping and transferring data pulses from AUI 26 to twisted pair link 24 over differential path (TPO+, TPO−) 48.

MAU 22 further comprises an internal crystal oscillator 50 for providing a synchronous system clock having input leads (CLKI, CLKO) 52 for either attaching a crystal thereto or for the input of an external clock; a LED driver array 54 having a plurality of outputs 56 (LEDL, LEDC, LEDR, LEDT, LEDJ, LEDP/S) for indicating the status of link integrity, collision, receive, transmit, jabber, and reversed polarity, respectively; a reversed polarity detect circuit 58 having an enable input (PRC) 60 for detecting and reversing polarity of differential path (TPI+, TPI−) 44; a link integrity test circuit 62 having an enable input (LI) 64 for detecting inactivity of twisted pair link 24; a mode select circuit 66 having mode select input 68 (MD0, MD1) for selecting operating modes; a signal quality error test circuit 70, having an enable input (SQE) 72, for forcing a signal quality error test sequence to be sent to AUI 26 over differential path (CI+, CI−) 40 after every successful transmission over differential path (TPO+, TPO−) 48; a loopback circuit 74 for looping back data received by AUI transmit-receiver 30 to AUI receiver-driver 34; a collision detector circuit 76 for detecting simultaneous activity on twisted pair link 24; a squelch circuit 78 for controlling gain of AUI receiver-driver 34; and a watchdog timer circuit 80 for providing a predetermined timeout period for jabber control.

AUI transmit-receiver 30 transfers data from (DO+, DO−) 32 to TP-driver 46. TP-driver 46 serially transfers data to twisted pair link 24 over (TPO+, TPO−) 48 by first pre-distorting it to meet the 10Base-T jitter template for twisted pair links and then filtering it with a transmit filter to meet FCC radiation requirements.

Watchdog timer 80 provides a predetermined timeout period for "jabber control" so that DTE 28 does not monopolize twisted pair link 24. Alternatively stated, watchdog timer 80 prevents DTE 28 from locking into a continuous transmit mode. If transmission time exceeds a predetermined limit set by watchdog timer 80, TP-driver 46 and loopback circuit 74 are disabled and a SQE signal is sent to DTE 28 by collision driver 38 described infra. Once in jabber control, the signal over (DO+, DO−) 32 to AUI transmit-receiver 21 must remain inactive for the period of time set by watchdog timer 80 before jabber control is exited.

TP-driver 46 enters an idle state if the differential signal on (DO+, DO−) 32 falls below 75% of a predetermined threshold level for a period of time equivalent to eight bit periods. During the idle state, link integrity circuit 62 causes TP-driver 46 to transmit link integrity test pulses over twisted pair link 24.

Serial data pulses and link integrity test pulses from twisted pair link 24 are received over (TPI+, TPI−) 44 into TP-receiver 42, polarity detect circuit 58 and squelch circuit 78. The output of TP-receiver 42 is coupled to AUI receiver-driver 34 for transfer to AUI 26. Squelch circuit 78 controls the gain of AUI receiver-driver 34 to discriminate noise from both link integrity test pulses and valid data pulses. Squelch circuit 78 only activates AUI receiver-driver 34 upon receipt of a valid stream of data. Squelch circuit 78 deactivates AUI receiver-driver 34, causing it to enter into the idle state, if the differential input over (TPI−, TPI−) 44 falls below 75% of a predetermined threshold level for a period of time equivalent to eight bit periods. The predetermined threshold is reduced 3 DB to allow for longer loops in low noise environments by forcing (MD0, MD1) of mode select input 68 to (1,1).

Polarity detect circuit 58 includes a first and second counter for counting link integrity test pulses and end-of-frame data pulses to determine polarity of the received signal. A reverse polarity condition is detected when the first counter detects eight opposite received link integrity test pulses without receipt of a link integrity test pulse with the expected polarity, and a reversed polarity condition is also detected when a second counter detects four frames of received data with a reversed start-of-idle. First and second counters are reset to zero whenever the reversed polarity is detected and reversed. Polarity of (TPI+, TPI−) 44 is reset to the default "non-reversed" condition if MAU 22 detects a link failure of twisted pair link 24 and no data or link integrity test pulses are received within a predetermined amount of time. If enable input (LI) 64 is not asserted, polarity detect circuit 58 ignores the first counter and detects polarity based only on the second counter detecting four frames of received data with a reversed start-of-idle.

Collision detector 76 detects collisions on twisted pair link 24. A collision is the simultaneous presence of valid signals over (TPO+, TPO−) 48 and (TPI+, TPI−) 44. Collision driver 38 reports collisions to AUI 26 by sending a 10 Mhz collision report signal over (CI+, CI−) 40. The duration of the collision report signal is less than nine bit periods after collision detector 76 detects a collision. If TP-receiver 42 becomes active while there is activity on TP-driver 46, loopback circuit 74 is disabled by collision driver 38 and remaining data in TP-receiver 42 is passed through AUI receiver-driver 34 to DTE 28. Loopback circuit 74 is also disabled when a link failure occurs or a jabber control state is entered. Loopback circuit 74 internally loops back data from AUI transmit-receiver 30 to AUI receiver-driver 34.

If SQE enable 72 is asserted, SQE test circuit 70 forces collision driver 38 to send a SQE signal for a duration of time of at least five bit periods to AUI 26 over (CI+, CI−) 40 after every successful transmission over twisted pair link 24. When MAU 22 is used as a repeater, SQE test circuit 70 is disabled by disasserting SQE enable 72.

Link integrity circuit 62 also determines the status of twisted pair link 24. When enabled by asserting (LI) 64, link integrity circuit 62 forces TP-receiver 42 to recognize link integrity test pulses on (TPI+, TPI−) 44 which are present on twisted pair link 24 in absence of other traffic. If no data or link integrity test pulses are detected within a predetermined amount of time, link integrity circuit 62 forces MAU 22 to enter a link failure state, disabling loopback circuit 74 and TP-driver 46. MAU 22 remains in the link failure state until data or at least two link integrity test pulses are detected.

MAU 22 is configured to automatically engage its AUI port when (LEDL) of LED driver array 56 is connected to (MD0) of mode select input 68 and MD1 of mode select input 68 is set to a logical one. LEDL of LED driver array 56 goes high when link integrity circuit 62 signals a link failure causing MD0 of mode select input 68 to go high. The AUI port of MAU 22 is isolated from commonly connected DI and CI circuits of AUI 26 by forcing it to a high impedance state when MD0 and MD1 are asserted high. The AUI port engages when link integrity circuit 62 does not indicate a link failure (LEDL is low). Alternately stated, the AUI port of MAU 22 is only active when link integrity circuit 62 detects data or link integrity test pulses on twisted pair link 24. In response to a link failure (LEDL is high), AUI port paths (DI+, DI−) 36 and (CI, CI−) 40 advance into a high impedance state and activity on (DO+, DO−) 32 is ignored by MAU 22. Detection of activity on twisted pair link 24 continues even though MAU 22 is disengaged from AUI 26. If activity resumes on twisted pair link 24, MAU 22 re-engages its AUI port by enabling the DO, DI, and Ci circuits.

Figure 3:
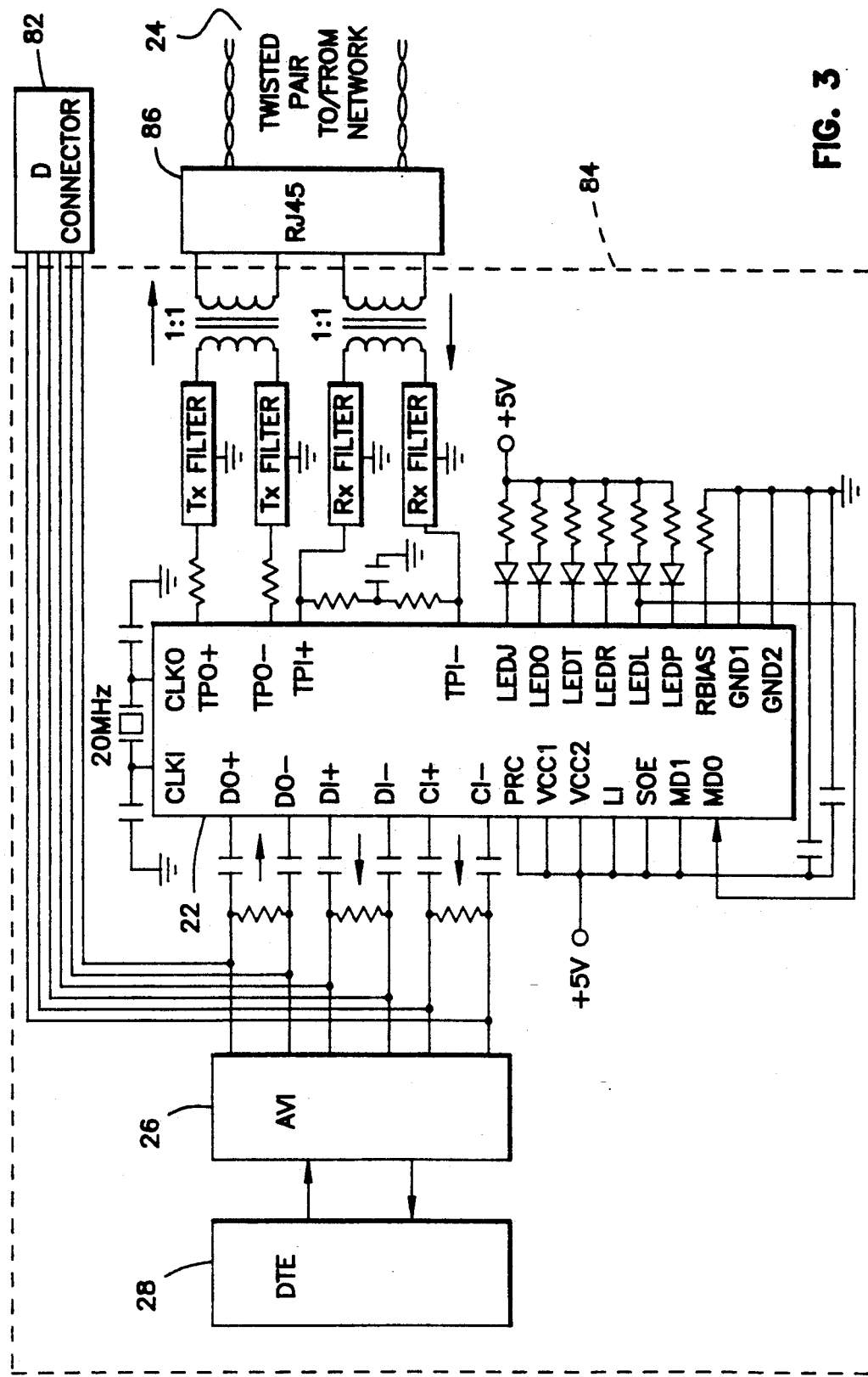
FIG. 3 is a block diagram illustrating a self contained station in a local area network having a 10Base-T (twisted pair) MAU constructed according to the principles of the present invention with the additional capability to interface with an Ethernet type MAU through a D-connector.

FIG. 3 illustrates a self contained station 84 in a LAN 20 having an automatic engaging 10Base-T (twisted pair) MAU 22 commonly connected at AUI 26 with an Ethernet MAU D-connector 82. 10Base-T MAU 22 is disposed with AUI 26 and DTE 28 in self contained station 84, such as a computer cabinet. D-connector 82 and RJ45 connector 86 are the only externally exposed elements from self contained station 84. 10Base-T MAU 22 automatically isolates itself if no connection is made to RJ45 connector 86. The LAN user can elect to use either 10Base-T or Ethernet type links without disturbing hardware in self contained station 84 by simply plugging the appropriate mate connector in for either D-connector 82 or RJ45 connector 86.

The detailed description of the preferred embodiment of the invention having been set forth herein for the purpose of explaining the principles thereof, it is known that there may be modifications, variations or changes in the invention without departing from the proper scope of the invention in terms of the claims thereto.

We claim:

1. A local area network having a physical layer with a twisted pair transmission media and an alternative transmission media, comprising:
   a) first media attachment means for interfacing an attachment unit interface to said twisted pair transmission media;
   b) second media attachment means, commonly coupled with said first media attachment means to said attachment unit interface, for interfacing said attachment unit interface to said alternative transmission media; and
   c) isolation means, responsive to inactivity on said twisted pair transmission media, for isolating said first media attachment mean from said attachment unit interface and from said second media attachment means, wherein the attachment unit interface can transmit and receive using the second media attachment means.

2. A local area network in accordance with claim 1, wherein said alternative transmission media is an Ethernet type coaxial link.

3. A self contained station in a local area network having alternative coaxial and twisted pair transmission media, said station having a data terminal equipment and an attachment unit interface coupled thereto, comprising;
   a) an externally accessible Ethernet type D-connector coupled to said attachment unit interface, for interfacing said attachment unit interface to an Ethernet type MAU cable;
   b) a 10Base-T twisted pair media attachment unit for interfacing said attachment unit interface to said twisted pair transmission medium, said 10Base-T media attachment unit having an AUI port coupled to said attachment unit interface wherein said AUI port advances into a high impedance condition in response to inactivity for a predetermined time on said twisted pair transmission medium, wherein the attachment unit interface can transmit and receive using the Ethernet type MAU cable; and c) an externally accessible RJ45 type connector coupled to said 10Base-T media attachment unit, for interfacing said 10Base-T media attachment unit to said twisted pair transmission medium.

4. The self contained station in accordance with claim 3, wherein a user elects either a 10Base-T (twisted pair) link by plugging a RJ45 mate connector thereto in said RJ45 connector or an Ethernet type link by plugging a D-connector mate attached thereto in said D-connector.

5. A local area network comprising a plurality of stations, each station comprising an attachment unit interface, an Ethernet media attachment unit for interfacing to a coaxial type link and a 10Base-T MAU for interfacing to a twisted pair link, wherein said Ethernet media attachment unit and said 10Base-T MAU each have an AUI port commonly connected to said attachment unit interface, and further wherein said 10Base-T MAU includes auto-engage means, responsive to inactivity on said twisted pair link, for isolating said 10Base-T AUI port from said attachment unit interface by putting said 10Base-T AUI port into a high impedance condition thereby permitting the attachment unit interface to transmit and receive using the coaxial type link.

6. A local area network (LAN), a media attachment unit for interfacing an attachment unit interface to a twisted pair link, the media attachment unit comprising:
   a) an AUI port having data out, data in, and collision presence circuit coupling said attachment unit interface to said media attachment unit;
   b) a twisted pair port having data out, data in, and collision presence circuits for coupling said twisted pair link to said media attachment unit; and
   c) auto-engage means, coupled to said twisted pair link and responsive to inactivity on said twisted pair link, for putting said AUI port data in and said AUI port collision presence circuits into a high impedance condition, thereby disabling communication between said attachment unit interface and said twisted pair link, said auto-engage means further comprises means for monitoring said twisted pair link for a link integrity test pulse or a valid data pulse, and means for identifying inactivity on said twisted pair link when neither said link integrity test pulse or valid data pulse are present for a predetermined time.

7. A MAU in accordance with claim 6, further comprising mode select means for selecting auto-engage means.

8. A MAU in accordance with claim 7, further comprising a LED driver, responsive to inactivity on said twisted pair link, for driving an LED indicator and for driving said mode select means.

9. A MAU in accordance with claim 6, further comprising a reversed polarity detection and correction circuit for detecting and correcting polarity of a received signal on said twisted pair port.

10. The MAU of claim 9, wherein the reversed polarity detection and correction circuit comprises:
    i) first counter means, coupled to said twisted pair port, for indicating eight received link integrity test pulses having an unexpected polarity were received without receipt of a link integrity test pulse with expected polarity; and
    ii) second counter means, coupled to said twisted pair port, for indicating four frames of received data with a reversed start-of-idle were received.

11. A media attachment unit in accordance with claim 9 further comprising:
    i) means for internally pre-distorting data to fit a 10Base-T jitter template of said twisted pair link;
    ii) means for serially transmitting said pre-distorted data through said twisted pair link to at least one remote 10Base-T MAU;
    iii) jabber control means, responsive to an abnormal long data stream, for interrupting the means for serially transmitting pre-distorted data.

12. A 10Base-T MAU comprising an AUI port in accordance with propsed standards of IEEE supplement (P802.3I/D10) for LANs, and an auto-engage means, responsive to activity on a twisted pair link, for engaging said AUI port to an AUI, wherein said auto-engage means further comprises means for monitoring said twisted pair link for a link integrity test pulse or a valid data, and means for identifying inactivity on said twisted pair link when neither said link integrity test pulse or said valid data pulse are present for a predetermined time.

* * * * *